US012226803B2

(12) United States Patent
Bao et al.

(10) Patent No.: US 12,226,803 B2
(45) Date of Patent: Feb. 18, 2025

(54) DEVICE FOR SEPARATING AND RECOVERING FLAT-PLATE CATALYST POWDER AND METHOD FOR DETERMINING WEAR RATIO

(71) Applicants: Huaneng Chongqing Luohuang Power Generation Co., Ltd, Chongqing (CN); Suzhou Xire Energy Saving Environmental Protection Technology Co. Ltd., Jiangsu (CN)

(72) Inventors: Yingjie Bao, Chongqing (CN); Jieyong Hao, Chongqing (CN); Changkai Yu, Chongqing (CN); Xun Wu, Chongqing (CN); Xianchun Zhou, Chongqing (CN); Yanxuan Liang, Chongqing (CN); Rongfu Tang, Chongqing (CN); Feiyun Chen, Chongqing (CN); Bin Luo, Chongqing (CN); Kaiyou Liao, Chongqing (CN); Danping Zhang, Chongqing (CN); Chao Li, Chongqing (CN); Fanhai Kong, Chongqing (CN); Lele Wang, Chongqing (CN); Qiang Bao, Chongqing (CN); Chuan He, Chongqing (CN)

(73) Assignees: HUANENG CHONGQING LUOHUANG POWER GENERATION CO., LTD, Chongqing (CN); SUZHOU XIRE ENERGY SAVING ENVIRONMENTAL PROTECTION TECHNOLOGY CO., LTD., Suzhou (CN)

( * ) Notice: Subject to any disclaimer, the term of this patent is extended or adjusted under 35 U.S.C. 154(b) by 18 days.

(21) Appl. No.: 18/343,752

(22) Filed: Jun. 29, 2023

(65) Prior Publication Data

US 2024/0066556 A1 Feb. 29, 2024

Related U.S. Application Data

(63) Continuation of application No. PCT/CN2023/092638, filed on May 8, 2023.

(30) Foreign Application Priority Data

Aug. 31, 2022 (CN) ......................... 202211060953.8

(51) Int. Cl.
*B07B 9/02* (2006.01)
*B07B 7/06* (2006.01)
(Continued)

(52) U.S. Cl.
CPC .................. *B07B 9/02* (2013.01); *B07B 7/06* (2013.01); *B07B 7/08* (2013.01); *B07B 11/06* (2013.01)

(58) Field of Classification Search
CPC .... B07B 7/06; B07B 7/08; B07B 9/02; B07B 11/06; B01J 37/00; B01J 37/009
See application file for complete search history.

(56) References Cited

U.S. PATENT DOCUMENTS 4,720,473 A * 1/1988 Welch .................... C10G 45/02 209/687
5,916,529 A * 6/1999 Scheuerman .......... B01J 8/1881 422/219
(Continued)

FOREIGN PATENT DOCUMENTS

| | | | | |
|---|---|---|---|---|
| CN | 209624280 U | * 11/2019 | | |
| CN | 111989289 A | * 11/2020 | ............ | B01J 15/005 |
| WO | WO-2013161703 A1 | * 10/2013 | .............. | B01J 23/88 |

*Primary Examiner* — Joseph C Rodriguez
(74) *Attorney, Agent, or Firm* — Ming Jiang; OPENPTO US LLC

(57) ABSTRACT

A device for separating and recovering flat-plate catalyst powder and a method for determining a wear ratio are provided. The device includes a powder separation unit and (Continued)

a powder recovery unit, a powder accumulation bin is respectively connected with a shell and a catalyst powder outlet, a cyclone outlet is configured on an inner side of a recovery shell, and a primary filter and a secondary filter are configured on an inner side wall of the recovery shell.

10 Claims, 2 Drawing Sheets

(51) Int. Cl.
*B07B 7/08* (2006.01)
*B07B 11/06* (2006.01)

(56) References Cited

U.S. PATENT DOCUMENTS

| | | | | |
|---|---|---|---|---|
| 5,961,675 | A * | 10/1999 | Son | B01D 46/71 55/307 |
| 11,919,041 | B2 * | 3/2024 | Seiringer | B07B 4/025 |
| 2010/0292073 | A1 * | 11/2010 | Quinones | B01J 37/009 502/208 |

* cited by examiner

DEVICE FOR SEPARATING AND RECOVERING FLAT-PLATE CATALYST POWDER AND METHOD FOR DETERMINING WEAR RATIO

CROSS-REFERENCE TO RELATED APPLICATIONS

This application is a continuation of PCT/CN2023/092638, filed May 8, 2023 and claims priority of Chinese Patent Application No. 202211060953.8, filed on Aug. 31, 2022, the entire contents of which are incorporated herein by reference.

TECHNICAL FIELD

The present application belongs to the technical field of catalyst separation, and relates to a device for separating and recovering flat-plate catalyst powder and a method for determining a wear ratio.

BACKGROUND

Selective Catalytic Reduction (SCR) catalysts for flue gas are mainly classified as honeycomb catalysts and flat-plate catalysts. The flat-plate catalyst is pressed and baked with a flat-plate metal mesh as the base material, and is widely used in SCR denitrification as it effectively adapts to severe flue gas conditions such as high dust and high arsenic and does not collapse due to a robust stainless steel metal mesh. The main active material of the flat-plate catalyst is the catalyst coating applied to the metal grid, which is the basis of its application, therefore, an important indicator for evaluating the flat-plate catalyst is the wear area of the surface coating, i.e. the wear ratio. As stated in the DL/T2090-2020 Guidelines for Flue Gas $DeNO_x$ Catalysts Scrap of Fossil-fuel Power Plant, if "the area of the worn and exposed part of a unit or the plate of a flat-plate catalyst is greater than 10% of the area of the plate, the unit or plate should be scrapped, and if more than ⅓ of units in the module or the plate reaches the above regulation, the whole module should be scrapped". Accordingly, it is of great importance to determine the wear ratio of the flat-plate catalyst for production and application.

Flat-plate catalysts generally have three to four bends in the width range of one plate, the bending length of which is not easy to measure, and the irregular shape of the wear in daily use makes it even more difficult to obtain the wear ratio by conventional measurements, causing inconvenience in evaluating whether the flat-plate catalyst is scrapped or can still be applied. Therefore, it is necessary to develop a set of reliable and user-friendly devices and supporting methods to accurately evaluate the wear ratio of the flat-plate catalyst.

SUMMARY

The present application aims to solve the problem in the prior art that flat-plate catalysts with bends are subject to large errors of wear measurement at the bends under conventional measurements, and the wear is not accurately measured at the bends, resulting in lower accuracy for testing the wear of the catalyst, and therefore provides a device for separating and recovering flat-plate catalyst powder and a method for determining a wear ratio.

In order to achieve the above objectives, the present application adopts the following technical schemes:

a device for separating and recovering flat-plate catalyst powder, including a powder separation unit and a powder recovery unit;

the powder separation unit including a driving motor, counter-rotating rollers, rollers, a powder accumulation bin, a catalyst powder outlet, and a shell, the counter-rotating rollers and the rollers being configured inside the shell, the driving motor driving the counter-rotating rollers to operate, the counter-rotating rollers and the rollers being configured at intervals, one end of the powder accumulation bin being connected with the shell, and the other end of the powder accumulation bin being connected with the catalyst powder outlet;

the powder recovery unit including an induced draft fan, a powder recovery inlet, a cyclone outlet, a primary filter, a movable sealing sheet, a secondary filter, a cyclone passage and a recovery shell, the induced draft fan being connected to an induced draft fan interface, the powder recovery inlet being configured on an outer side wall of the recovery shell, the cyclone outlet being configured on an inner side wall of the recovery shell, and the cyclone passage being configured between the powder recovery inlet and the cyclone outlet; the primary filter and the secondary filter being sequentially configured on the inner side wall of the recovery shell from bottom to top, the secondary filter having a same cross-sectional size as the recovery shell, an opening being configured in a middle position of the primary filter, and the primary filter forming a conical surface with the diameter larger at a top and the diameter smaller at a bottom; and the catalyst powder outlet being connected with the powder recovery inlet.

A further improvement of the present application is that:

the movable sealing sheet is configured in the middle position of the primary filter;

the counter-rotating rollers are configured in three groups;

end faces of the three groups of counter-rotating rollers are located at a same height;

the rollers are configured in six groups;

two installation spaces are configured between the three groups of counter-rotating rollers, and three groups of the rollers are configured in each of the installation spaces;

end faces of the three groups of counter-rotating rollers and the six groups of rollers are arranged sinusoidally; and the powder accumulation bin has a trapezoidal cross section.

A method for determining a wear ratio of a flat-plate catalyst, using the device for separating and recovering flat-plate catalyst powder as described above, includes the following steps:

after making a flat-plate catalyst plate with a wear ratio to be detected pass through the device for separating and recovering flat-plate catalyst powder, taking out collected powder, drying in an oven at 58-62 degrees Celsius (° C.) for 30 minutes (min), and after cooling to a room temperature, weighing and recording a mass of the collected powder as M1;

after making a new catalyst sample plate with a same specification pass through the device for separating and recovering flat-plate catalyst powder, taking out collected powder, drying in the oven at 58-62° C. for 30 min, and after cooling to the room temperature, weighing and recording a mass of the collected powder as M2; and determining a wear ratio F of the tested flat-plate catalyst plate as:

$$F = \frac{M2 - M1}{M2} \times 100\%.$$

Compared with the prior art, the present application has the following beneficial effects:

the powder separation unit of the present application enables the counter-rotating rollers and rollers to grind the flat-plate catalyst, so as to separate the plate and powder of the flat-plate catalyst completely, and the powder is effectively recovered after deposition through multi-stage filtration in the powder recovery unit, thus improving the standardization for separating and recovering powder as well as reducing measurement errors; and the method for determining the wear ratio provided in the present application is designed to obtain an accurate wear ratio by means of weight comparison based on the device for separating and recovering powder, thereby solving the problem of incapable of determining the wear in the depth direction of the bends of the flat-plate catalyst, and effectively lowering the measurement error and improving work efficiency.

BRIEF DESCRIPTION OF THE DRAWINGS

To illustrate more clearly the technical schemes of the embodiments of the present application, a brief description of the accompanying drawings to be used in the embodiments is given below. It should be understood that the following accompanying drawings only illustrate certain embodiments of the present application and should therefore not be regarded as limiting the technical scope, and that other relevant accompanying drawings are available on the basis of these drawings to a person of ordinary skill in the art without any creative effort.

Figure 1:
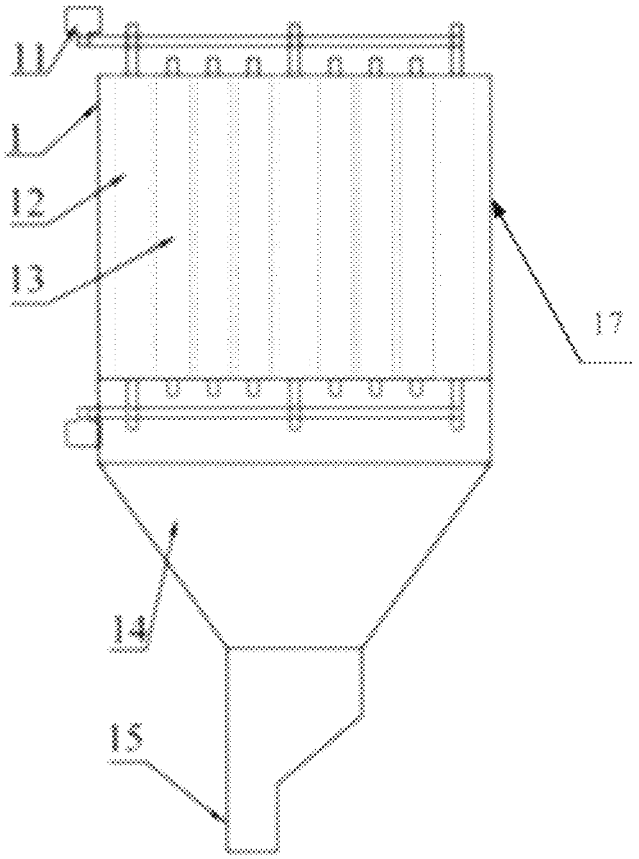
FIG. 1 is a schematic structural diagram of a powder separation unit of the present application.

Among them: 1—powder separation unit; 10—separation device inlet; 11—driving motor; 12—counter-rotating roller; 13—roller; 14—powder accumulation bin; 15—catalyst powder outlet; 16—separation device outlet; 17—shell; 111—flat-plate catalyst; 2—powder recovery unit; 20—powder recovery inlet; 21—cyclone outlet; 22—primary filter; 23—movable sealing sheet; 24—secondary filter; 25—cyclone passage; 30—primary recovery chamber; 31—secondary recovery chamber; 41—induced draft fan interface; 42—collection bin, 43—recovery shell.

DETAILED DESCRIPTION OF THE EMBODIMENTS

To make the objectives, technical schemes and advantages of embodiments of the present application more explicit, a clear and complete description of the technical schemes in the embodiments of the present application is given below in conjunction with the accompanying drawings in the embodiments of the present application. It is obvious that the embodiments described are part, rather than all, of the embodiments of the present application and not all of them. The components of the embodiments of the present application, which are generally described and illustrated in the accompanying drawings herein, are capable of being arranged and designed in a variety of different configuration.

The following detailed description of the embodiments of the present application provided in the accompanying drawings is therefore not intended to limit the scope of the present application for which protection is claimed, but merely to indicate selected embodiments of the present application. Based on the embodiments in the present application, all other embodiments obtained without creative effect by a person of ordinary skill in the art shall fall within the scope of protection of the present application.

It should be noted that similar labels and letters indicate similar items in the accompanying drawings below, hence, once an item is defined in one accompanying drawing, it needs no further definition or explanation in the subsequent accompanying drawings.

In the description of embodiments of the present application, it should be noted that where the terms "up", "down", "horizontal", "in" etc. indicate an orientation or positional relationship based on the orientation or positional relationship shown in the accompanying drawings, or an orientation or positional relationship in which the product of the present application is customarily placed when in use, it is only for the purpose of facilitating and simplifying the description of the present application, and does not indicate or imply that the device or element referred to must have a particular orientation, or be constructed and operated in a particular orientation, and is therefore not to be understood as a limitation of the present application. Moreover, the terms "first", "second", etc. are used only to distinguish the description and are not to be understood as indicating or implying relative importance. Furthermore, where the term "horizontal" appears, it does not indicate that the part is required to be absolutely horizontal, but may be slightly inclined. For instance, "horizontal" simply means that the orientation is more horizontal in relation to "vertical" and does not mean that the structure must be perfectly horizontal, but can be slightly inclined.

In the description of the embodiments of the present application, it should also be noted that the terms "set", "installed", "connected" and "connection" are to be understood in a broad sense, unless otherwise expressly specified and limited. For example, it can be a fixed connection, a detachable connection, or integral connection; it can be a mechanical connection or an electrical connection; it can be a direct connection or an indirect connection via an intermediate medium, and it can be an internal connection between two elements. For a person of ordinary skill in the art, the specific meaning of the above terms in the context of the present application is to be understood on a context-specific basis.

Figure 2:
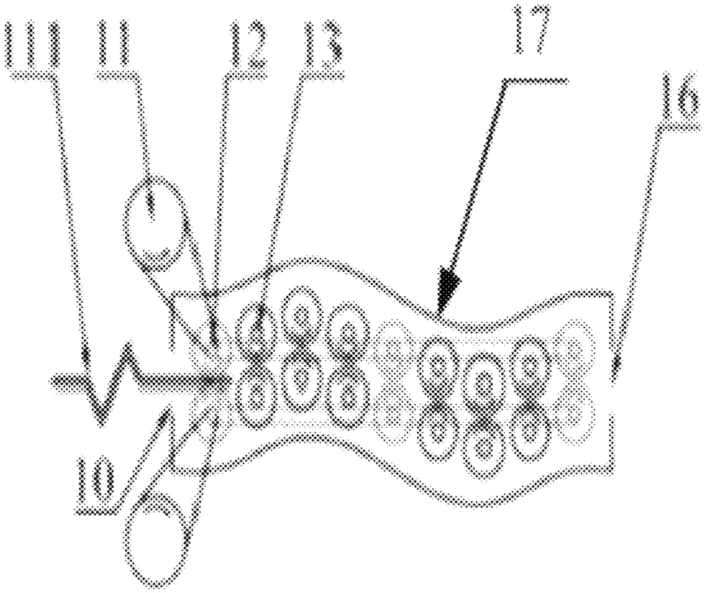
FIG. 2 is a schematic diagram showing roller arrangement in the powder separation unit of the present application.
Figure 3:
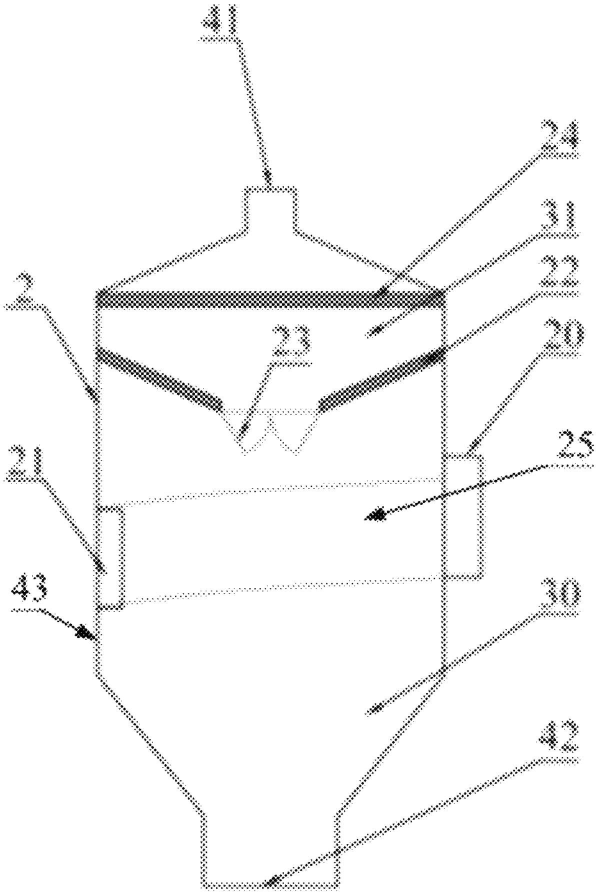
FIG. 3 is a schematic structural diagram of a powder recovery unit of the present application.

The present application is described in further detail below in conjunction with the accompanying drawings:

Referring to FIG. 1 and FIG. 2 which are schematic structural diagrams of a powder separation unit, a powder separation unit 1 includes a driving motor 11, counter-rotating rollers 12, rollers 13, a powder accumulation bin 14, a catalyst powder outlet 15 and a shell 17; the counter-rotating rollers 12 and rollers 13 are configured inside the shell 17, and the counter-rotating rollers 12 are configured in three groups, with end faces of the three groups of counter-rotating rollers 12 located on a same plane; the rollers 13 are configured in six groups, playing a grinding and transferring role; three groups of the rollers 13 are respectively configured in two intervals of the three groups of counter-rotating rollers 12, and end faces of the rollers are arranged sinusoidally; the driving motor 11 drives the counter-rotating rollers 12 located in the same plane to perform counter-rotating rolling work; one end of the powder accumulation bin 14 is connected with the shell 17, and the other end of the powder accumulation bin 14 is connected with the catalyst powder outlet 15. Referring to FIG. 3 which is a schematic structural diagram of a powder recovery unit, a powder recovery unit 2 includes an induced draft fan, a powder recovery inlet 20, a cyclone outlet 21, a primary filter 22, a movable sealing sheet 23, a secondary filter 24, a cyclone passage 25 and a recovery shell 43; the induced draft fan is connected to an induced draft fan interface 41, the powder recovery inlet 20 is configured on an outer wall of the recovery shell 43, the cyclone outlet 21 is configured on an inner side wall of the recovery shell 43, the cyclone passage 25 is configured between the powder recovery inlet 20 and the cyclone outlet 21, the primary filter 22 and the secondary filter 24 is sequentially configured on the inner side wall of the recovery shell 43 from bottom to top, where the secondary filter 24 is configured on a cross section of the recovery shell 43, an opening is configured in a middle position of the primary filter 22, and the primary filter 22 forms a conical surface with the diameter larger at a top and the diameter smaller at a bottom.

In use, the catalyst powder outlet 15 and the powder recovery inlet 20 are connected, and a method for determining a wear ratio of a flat-plate catalyst according to the device for separating and recovering flat-plate catalyst powder specifically includes the following steps:

before operation, the catalyst powder outlet 15 and the powder recovery inlet 20 are connected, and the induced draft fan at the induced draft fan interface 41 is initiated to enable the whole device for separating and recovering powder to be in a negative pressure state, where the movable sealing sheet 23 is in a closed state, that is, at the dotted line position, and the whole system has good sealing performance;

the driving motor 11 is initiated and a flat-plate catalyst 111 is sent into the powder separation unit 1 from a separation device inlet 10; after the catalyst plate is ground and transferred by the three groups of counter-rotating rollers 12 and the six groups of rollers 13, the powder is separated from the catalyst plate, the catalyst plate leaves the powder separation unit 1 through a separation device outlet 16, and the powder then leaves the powder separation unit 1 through the catalyst powder outlet 15 after passing through the powder accumulation bin 14 under the negative internal pressure of the device;

subsequently, a mixture of the catalyst powder and air enters the powder recovery unit 2 through the powder recovery inlet 20, and enters a primary recovery chamber 30 from the cyclone outlet 21 through the cyclone passage, where the large-particle powder avoids falling due to cyclone hitting against the chamber of the recovery device, while the air flow velocity rapidly decreases, and the combined effect of the two aspects creates a first deposit that lands on a collection bin 42;

then, the mixture passes through the primary filter 22, where the movable sealing sheet 23 is in a closed state as a result of the negative pressure in a secondary recovery chamber 31, and the mixture can only pass through the primary filter 23, forming a secondary deposit that lands on the collection bin 42;

the mixture after passing through the primary filter is in the secondary recovery chamber 31 and continues to pass through the secondary filter 24, forming a third deposit that lands on the movable sealing sheet 23; and the air after passing through the multi-stage filter leaves the powder recovery unit 2 through the induced draft fan interface 41;

when the induced draft fan is turned off, the negative pressure in the secondary recovery chamber 31 disappears, the movable sealing sheet 23 is then opened, and the powder descends from the movable sealing sheet and is deposited on the collection bin 42 of the powder recovery unit 2, thus, the separated powder all lands on the collection bin 42;

the collection bin 42 is opened to take out the powder, which is dried in an oven at 58-62 degrees Celsius (° C.) for 30 minutes (min), cooled to a room temperature and then weighed, recorded as M1;

then a new catalyst sample plate with the same specification is taken to subject to the above powder separation and recovery process, then collected powder is taken out and dried in the oven at 58-62° C. for 30 min, cooled to the room temperature, and then weighed, recorded as M2; and a wear ratio F of the tested sample is obtained by calculation according to the following formula:

$$F = \frac{M2 - M1}{M2} \times 100\%.$$

To improve the accuracy of the M2, several new catalyst plates may be taken for testing, where a test block of the plates needs to be retained and the average of the multiple tests is taken and substituted into the formula to be calculated as an important basic data to be retained in a catalyst wear profile database.

The device provided in the present application allows for rapid separation and recovery of metal meshes and powder from catalyst plates, therefore improving the utilization of catalyst resources; the wear ratios of flat-plate catalysts has been regulated with standardized requirements and standardized profiles established, allowing for obtaining accurate wear ratios of catalyst plates, while ensuring the sample strength and uniformity of distribution of test flow rates, which is of great importance to the management, application and production of catalysts. The present application is used to test new catalysts as well as in-service catalysts, where the plate and powder are thoroughly separated after passing through 9 groups of rollers and the powder is completely recovered after multi-stage precipitation, and the accurate wear ratio is obtained by the weight comparison method, which solves the problem that image recognition fails to identify the wear in the depth direction, effectively reducing the measurement error and improving the work efficiency.

The above represents only preferred embodiments of the present application and is not intended to limit the present application, and the present application may be subject to various modifications and variations for those skilled in the art. Any modification, equivalent substitution, improvement, etc. made within the spirit and principles of the present application shall be included within the protection scope of the present application.

The invention claimed is:

1. A device for separating and recovering flat-plate catalyst powder, comprising a powder separation unit and a powder recovery unit;

the powder separation unit comprising a driving motor, counter-rotating rollers, rollers, a powder accumulation bin, a catalyst powder outlet, and a shell, the counter-rotating rollers and the rollers being configured inside the shell, the driving motor driving the counter-rotating rollers to operate, the counter-rotating rollers and the rollers being configured at intervals, one end of the powder accumulation bin being connected with the shell, and the other end of the powder accumulation bin being connected with the catalyst powder outlet;

the powder recovery unit comprising an induced draft fan, a powder recovery inlet, a cyclone outlet, a primary filter, a movable sealing sheet, a secondary filter, a cyclone passage and a recovery shell, the induced draft fan being connected to an induced draft fan interface, the powder recovery inlet being configured on an outer side wall of the recovery shell, the cyclone outlet being configured on an inner side wall of the recovery shell, and the cyclone passage being configured between the powder recovery inlet and the cyclone outlet; the primary filter and the secondary filter being sequentially configured on the inner side wall of the recovery shell from bottom to top, the secondary filter having a same cross-sectional size as the recovery shell, an opening being configured in a middle position of the primary filter, and the primary filter forming a conical surface with the diameter larger at a top and the diameter smaller at a bottom; and the catalyst powder outlet being connected with the powder recovery inlet.

2. The device for separating and recovering flat-plate catalyst powder according to claim 1, wherein the movable sealing sheet is configured in the middle position of the primary filter.

3. The device for separating and recovering flat-plate catalyst powder according to claim 1, wherein the counter-rotating rollers are configured in three groups.

4. The device for separating and recovering flat-plate catalyst powder according to claim 3, wherein end faces of the three groups of counter-rotating rollers are located at a same height.

5. The device for separating and recovering flat-plate catalyst powder according to claim 4, wherein the rollers are configured in six groups.

6. The device for separating and recovering flat-plate catalyst powder according to claim 5, wherein two installation spaces are configured between the three groups of counter-rotating rollers, and three groups of the rollers are configured in each of the installation spaces.

7. The device for separating and recovering flat-plate catalyst powder according to claim 6, wherein end faces of the three groups of counter-rotating rollers and the six groups of rollers are configured sinusoidally.

8. The device for separating and recovering flat-plate catalyst powder according to claim 1, wherein the powder accumulation bin has a trapezoidal cross section.

9. A method for determining a wear ratio of a flat-plate catalyst, providing the device for separating and recovering flat-plate catalyst powder according to claim 1, comprising following steps:

after making a flat-plate catalyst plate with a wear ratio to be detected pass through the device for separating and recovering flat-plate catalyst powder, taking out collected powder, drying in an oven at 58-62 degrees Celsius for 30 minutes, and after cooling to a room temperature, weighing and recording a mass of the collected powder as M1;

after making a new catalyst sample plate with a same specification pass through the device for separating and recovering flat-plate catalyst powder, taking out collected powder, drying in the oven at 58-62 degrees Celsius for 30 minutes, and after cooling to the room temperature, weighing and recording a mass of the collected powder as M2; and determining a wear ratio F of the tested flat-plate catalyst plate as:

$$F = \frac{M2 - M1}{M2} \times 100\%.$$

10. A method for determining a wear ratio of a flat-plate catalyst, providing the device for separating and recovering flat-plate catalyst powder according to claim 2, comprising following steps:

after making a flat-plate catalyst plate with a wear ratio to be detected pass through the device for separating and recovering flat-plate catalyst powder, taking out collected powder, drying in an oven at 58-62 degrees Celsius for 30 minutes, and after cooling to a room temperature, weighing and recording a mass of the collected powder as M1;

after making a new catalyst sample plate with a same specification pass through the device for separating and recovering flat-plate catalyst powder, taking out collected powder, drying in the oven at 58-62 degrees Celsius for 30 minutes, and after cooling to the room temperature, weighing and recording a mass of the collected powder as M2; and determining a wear ratio F of the tested flat-plate catalyst plate as:

$$F = \frac{M2 - M1}{M2} \times 100\%.$$

* * * * *